(12) United States Patent
Oberlander et al.

(10) Patent No.: US 8,122,818 B2
(45) Date of Patent: Feb. 28, 2012

(54) BARBEQUE AND SMOKER

(75) Inventors: Penny Mae Oberlander, Eagle Point, OR (US); James Richard Oberlander, Eagle Point, OR (US)

(73) Assignee: Iron Horse BBQ, Inc., Eagle Point, OR (US)

( * ) Notice: Subject to any disclaimer, the term of this patent is extended or adjusted under 35 U.S.C. 154(b) by 946 days.

(21) Appl. No.: 11/435,464

(22) Filed: May 16, 2006

(65) Prior Publication Data

US 2006/0254433 A1 Nov. 16, 2006

Related U.S. Application Data

(60) Provisional application No. 60/681,876, filed on May 16, 2005.

(51) Int. Cl.
*A23B 4/03* (2006.01)
*F24B 1/195* (2006.01)

(52) U.S. Cl. ............... 99/481; 99/479; 99/448; 126/550

(58) Field of Classification Search ............ 99/330–333, 99/339–341, 400, 401, 483, 444–450, 467–482; 126/25 R, 9 R, 41 R, 276, 17, 18, 27, 28, 126/67, 79
See application file for complete search history.

(56) References Cited

U.S. PATENT DOCUMENTS

| | | | | |
|---|---|---|---|---|
| 3,380,444 A | * | 4/1968 | Stalker | 126/25 R |
| 3,477,360 A | * | 11/1969 | Raney | 99/339 |
| 3,882,767 A | * | 5/1975 | Oyler et al. | 99/339 |
| 4,348,948 A | * | 9/1982 | Allison | 99/339 |
| 4,700,618 A | * | 10/1987 | Cox, Jr. | 99/339 |
| 4,757,756 A | * | 7/1988 | Van Marr | 99/482 |
| 5,195,423 A | * | 3/1993 | Beller | 99/340 |
| 6,167,797 B1 | * | 1/2001 | Bollich | 99/340 |
| 6,209,533 B1 | * | 4/2001 | Ganard | 126/25 R |
| 6,298,774 B1 | * | 10/2001 | Latham et al. | 99/340 |
| 6,626,089 B1 | * | 9/2003 | Hubert | 99/339 |
| 7,156,087 B1 | * | 1/2007 | Churchill et al. | 126/25 R |

OTHER PUBLICATIONS

"Top 10 Coolest BBQ Grills (And Then Some!)," author unknown, dated Jun. 8, 2006 and retrieved from "http://www.neatorama.com/2006/06/08/top-10-coolest-bbq-grills/" on Apr. 24, 2008, 52 pgs.
"Buzzard BBQ," author unknown, undated document, retrieved from "http://www.buzzardbbq.com/Train-Cooker-Smoker.html" on Apr. 24, 2008, 1 pg.

* cited by examiner

*Primary Examiner* — Henry Yuen
*Assistant Examiner* — Jianying Atkisson
(74) *Attorney, Agent, or Firm* — Blakely, Sokoloff, Taylor & Zafman

(57) ABSTRACT

An apparatus for barbecue cooking and smoking is described herein. Provided is a grill enclosure having a grill chamber and an adjustable vent to allow smoke to be released from the grill chamber. Additionally, an adjustable venting hood is coupled to the grill enclosure to channel and control smoke from the grill chamber. A smoker that is coupled to the venting hood receives the smoke channeled from the grill chamber. The smoker includes one or more racks connected to an axle capable of movement.

8 Claims, 3 Drawing Sheets

BARBEQUE AND SMOKER

RELATED APPLICATIONS

The present application claims the benefit of priority under 35 U.S.C. §119(e) to U.S. Provision Application No. 60/681,876, filed May 16, 2005.

FIELD

Embodiments of the invention relate to cooking devices, and more particularly to barbecues and smokers.

BACKGROUND

Barbeque cooking has been and continues to be a popular form of food preparation. Part of the allure of barbeque cooking is the exposure of the food to flame (direct or indirect), smoke created by any number of well-known techniques (e.g., wood, wood chips, wood pellets, or charcoal), and/or a combination thereof. Proper barbequing techniques, and in particular those predominantly or exclusively utilizing indirect heat or smoke, are often time consuming and may be enjoyed less frequently as a result despite the desired food outcome.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Various embodiments of the barbeque and smoker described herein provide the ability to combine the direct heat and smoke of a barbeque grill with the indirect heating and smoking of a smoker. Furthermore, the combination of the barbeque grill and the smoker may be a mobile trailer shaped like a locomotive that simultaneously offers the flexibility of travel and aesthetic appeal.

Figure 1A:
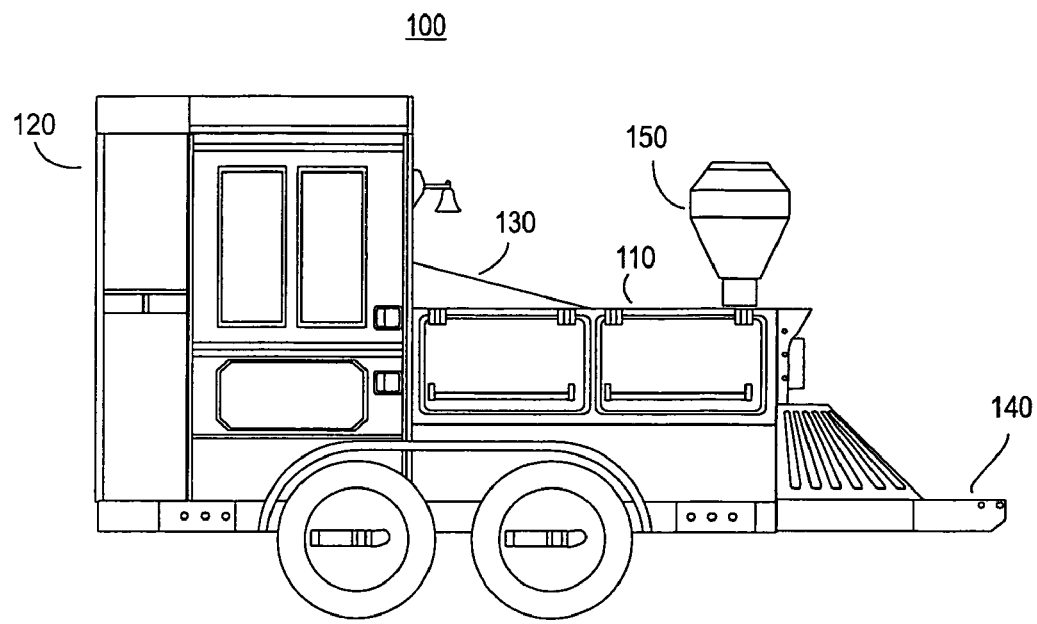
FIGS. 1A and 1B illustrate an external view of one embodiment of a barbeque and smoker.
Figure 1B:
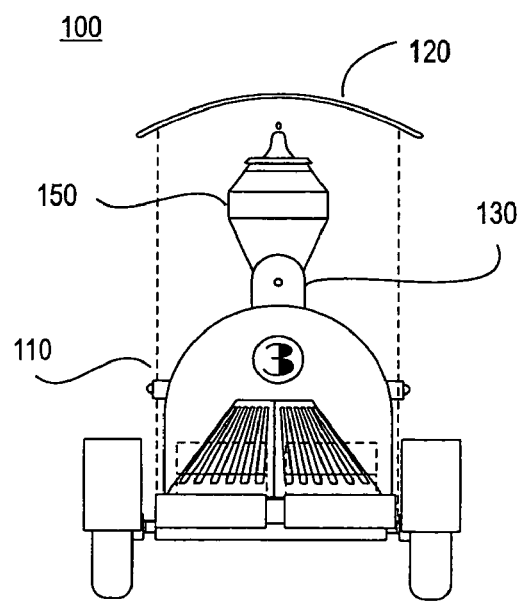

FIGS. 1A and 1B illustrate different perspectives of an external view of one embodiment of a barbeque and smoker. Generally speaking, the overall design of an embodiment includes a grill enclosure 110 (the body of the locomotive) and a smoker portion 120 (the cab of the locomotive). Both are mounted on a trailer 140 that can be, for example, towed by a car, truck, recreational vehicle, or any other type of vehicle that is capable of towing. Joining the grill enclosure 110 and the smoker portion 120 is a vent hood 130 that channels heat and smoke from the grill enclosure to the smoker portion.

Figure 2:
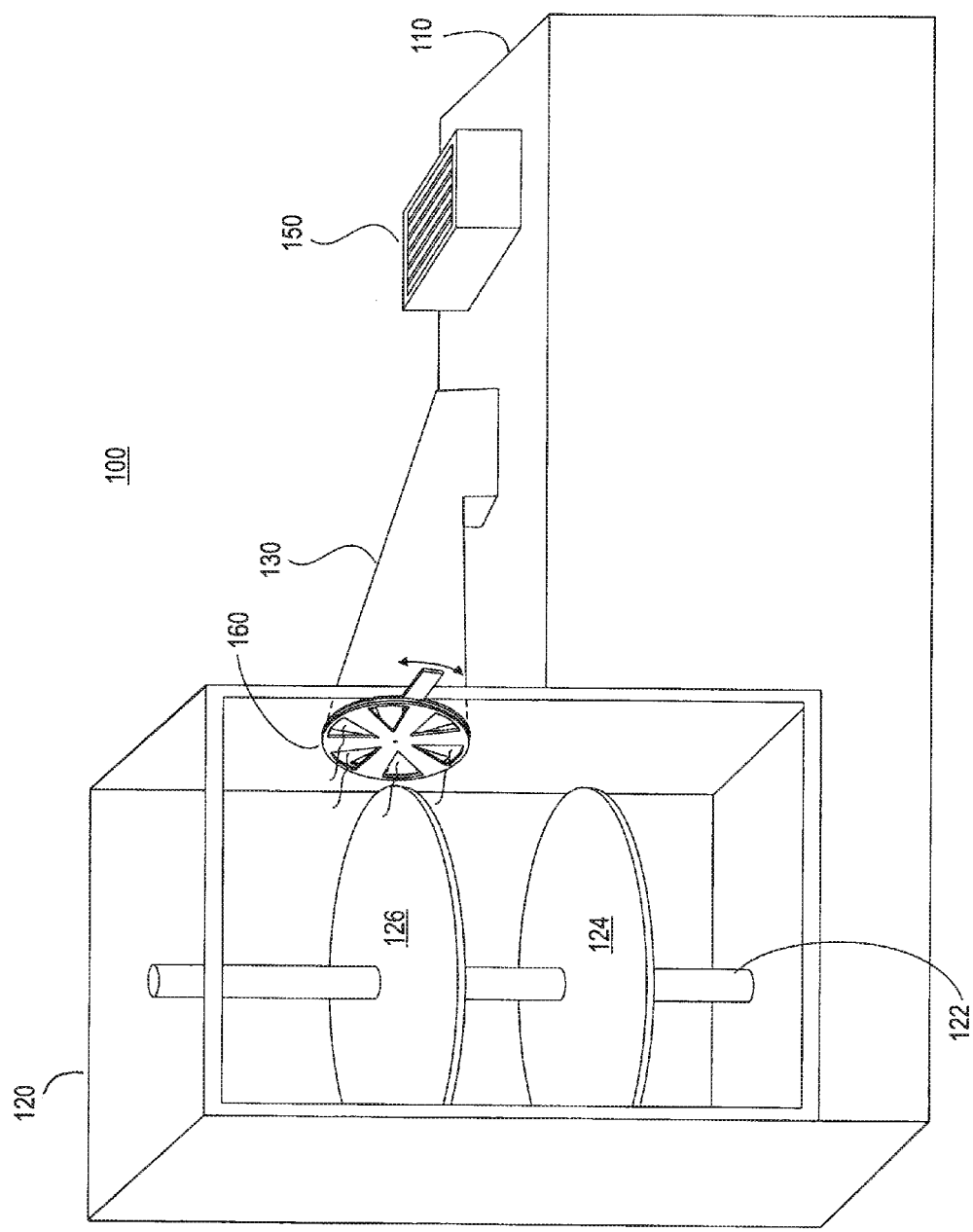
FIG. 2 illustrates a conceptual view of one embodiment of a barbeque and smoker.

FIG. 2 illustrates a conceptual view of one embodiment of a barbeque and smoker. In particular, the grill enclosure 110 may include an adjustable vent opening 150 that allows smoke and/or heat to be released from the interior, or grill chamber, of grill enclosure 110. Adjustable vent 150 provides control of both heat and smoke for grill enclosure 110, and subsequently, for smoker portion 120.

In one embodiment, adjustable vent hood 130 may channel smoke and/or heat from grill enclosure 110 to smoker portion 120. Adjustable vent hood 130 may function in combination with adjustable vent opening 150 to control smoke and/or heat for both grill enclosure 110 and smoker 120.

In one embodiment, smoker portion 120 may include circular racks 124-126 arranged as, for example, a Lazy Susan. In one embodiment, the circular rack or racks (though illustrated with two racks, there may be one or many racks) rotate around an axle 122 and can be adjusted for height/position along axle 122. In one embodiment, a motor is attached to the axle to cause the rotation. The ability to rotate the circular racks 124-126 and to adjust the height/position allows the user to control the amount of heat and smoke to which food items on the circular rack or racks is exposed. Further, the racks 124-126 may be rotated continuously around the axis to improve the uniformity with which the food items contained thereon are exposed to the indirect heat and smoke channeled through vent hood 130. Further still, multiple racks with different heights/positions may be employed to simultaneously smoke food items that would benefit from, for example, the heat difference created by the separation of the racks, the height/position of the racks, or a combination thereof.

Figure 3:
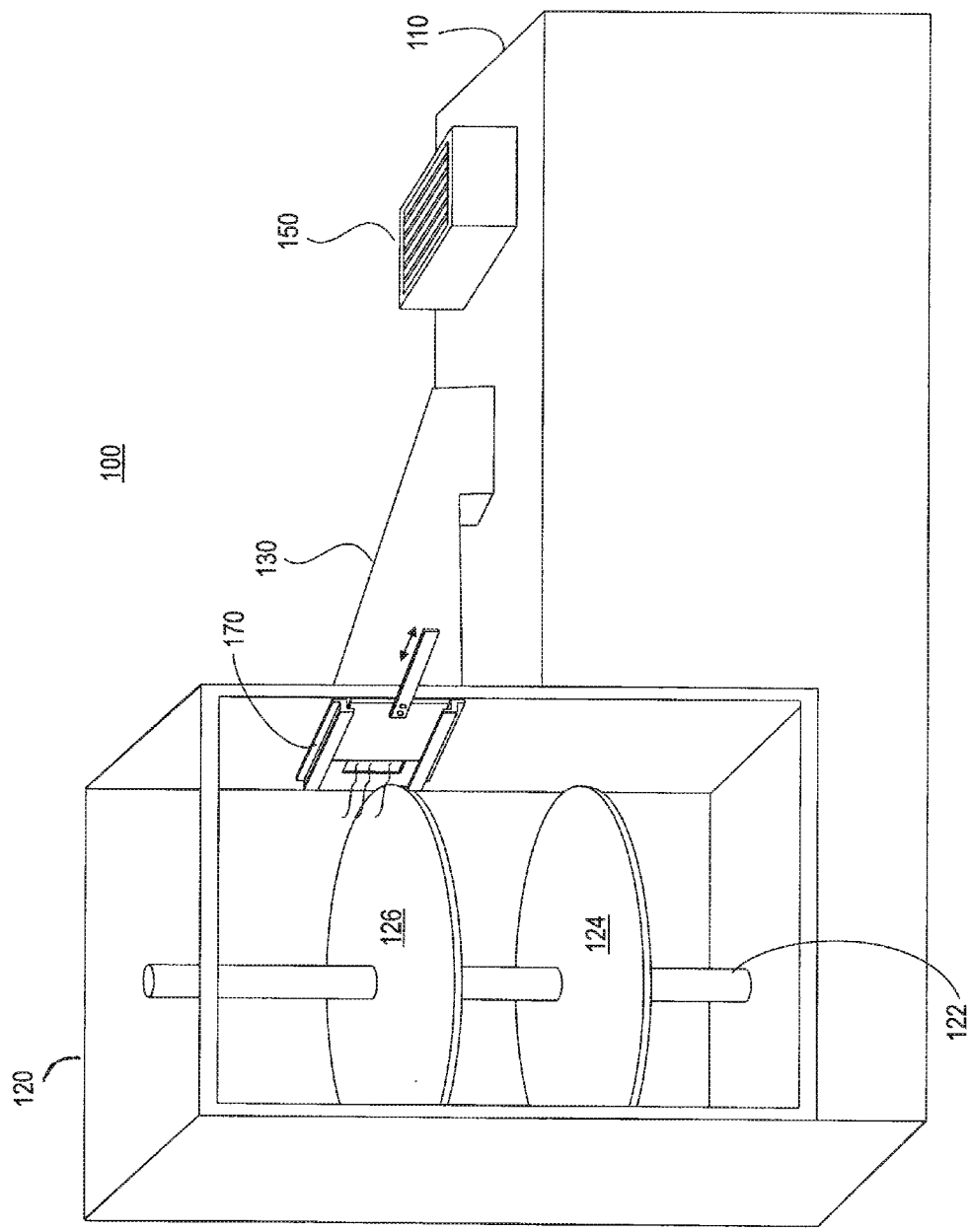
FIG. 3 illustrates a conceptual view of another embodiment of a barbeque and smoker.

The opening of vent hood 130 can be fully opened or fully closed. Additionally, vent hood 130 may further be adjusted to be in a partially open position for which the vent opening is neither fully open nor fully closed. The adjustability of vent hood 130 between fully open, fully closed, and positions between allows the amount of heat and smoke entering smoker portion 120 from grill enclosure 110 through vent hood 130 to be adjusted to control the cooking environment within the smoker portion chamber. In one embodiment, the adjustability of vent hood 130 is controlled by vent door 160. Vent door 160 is a wheel-shaped door that rotates between open and closed positions to control the flow of heat and smoke into smoker portion 120. FIG. 3 illustrates another embodiment including a sliding vent door 170 that may also be adjusted between open and closed positions. Additionally, adjustable vent 150 may also be adjusted between open and closed position by opening or closing an adjustable vent door (e.g. vent doors 160 and/or 170).

In one example embodiment of the invention, if food items on grill enclosure 110 require high heat, the opening of vent hood 130 may be only open a little so as to not overheat the smoker portion 120 chamber. The opening of vent hood 130 may be similarly adjusted to control the amount of smoke entering the smoker portion 120 depending on the environment of grill enclosure 110. Further, the opening of vent hood 130 may be in situ adjusted to accommodate a uniform smoking session that spans multiple grilling sessions of varying heat and smoke production or to modify the smoking environment during the smoking session.

In one embodiment, the smoke produced by the grill enclosure that is channeled through vent hood 130 and into the smoker portion 120 contains not only smoke produced by the fuel source in the grill (e.g., wood products, charcoal, or a combination thereof) but also smoke produced, if any, by the grilled food items if there are any food items present. Grill enclosure 110 may produce heat and smoke in the absence of any food items therein should it be necessary to operate an embodiment exclusively as a smoker.

The grill enclosure 110 may further include vent(s) 150 to the outside to mitigate the amount of smoke and heat that is directed to the smoker portion and/or to better control the grilling environment. For example, the vent opening of vent hood 130 in the smoker portion may, for a particular application, be in a relatively closed position. With such an arrangement, the outside chamber vent 150 can be used to further help control the temperature, smoke, an overall environment within the grill enclosure.

An embodiment combining both the grill enclosure and the smoker portion further allows simultaneous grilling and smoking, or either cooking method independently. By combining the two cooking methods, a user is able to more efficiently utilize the fuel source, as well as his or her time, to create grilled and/or smoked food products.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
    both a grill enclosure and a smoker, wherein the grill enclosure and the smoker to allow simultaneous grilling and smoking respectively and are to utilize a fuel source in the grill enclosure to create grilled and smoked food products respectively;
    a top enclosing member positioned above the grill enclosure;
    an adjustable vent coupled to the top enclosing member above the grill enclosure to allow a portion of smoke to be released from the grill enclosure;
    an adjustable venting hood having a first opening and coupled atop the top enclosing member above the grill enclosure to receive a remaining portion of the smoke to be released from the grill enclosure and further to channel the remaining portion of the smoke from the grill enclosure to the smoker;
    wherein the adjustable venting hood is positioned external to both the grill enclosure and the smoker, wherein the first opening of the adjustable venting hood is positioned upon a horizontal plane atop the enclosing member above the grill enclosure, wherein the adjustable venting hood slopes upward toward the smoker, and further wherein a second opening of the adjustable venting hood is positioned upon a vertical plane of the smoker;
    wherein the smoker is coupled to the second opening of the adjustable venting hood, the smoker having a smoking chamber to receive the smoke to be released and channeled from the grill enclosure via the adjustable venting hood, wherein the smoke to be released from the grill enclosure and to be channeled from the grill enclosure through the adjustable venting hood to the smoker contains smoke to be produced by the fuel source in the grill enclosure and also smoke to be produced from the grilled food products; and
    wherein the smoker includes one or more racks connected to an axle, the one or more racks capable of rotating around the axle.

2. The apparatus of claim 1, wherein the adjustable vent allows heat to be released from the apparatus to control the temperature of the grill enclosure.

3. The apparatus of claim 2, wherein the adjustable vent further allows heat to be released from the grill enclosure to control the temperature of the smoking chamber.

4. The apparatus of claim 1, wherein the adjustable vent and the adjustable venting hood operate in concert to control the temperature and the smoke in the grill enclosure and the smoking chamber.

5. A locomotive-shaped cooking apparatus, comprising:
    both a grill enclosure and a smoking chamber, wherein the grill enclosure and the smoking chamber to allow simultaneous grilling and smoking respectively and are to utilize a fuel source in the grill enclosure to create grilled and smoked food products respectively;
    a body portion of the locomotive-shaped cooking apparatus enclosing the grill enclosure;
    a top enclosing member positioned above the grill enclosure;
    an adjustable venting hood having a first opening and coupled atop the body portion of the locomotive-shaped cooking apparatus enclosing the grill enclosure therein, the adjustable venting hood to channel smoke from the grill enclosure to the smoking chamber;
    wherein the adjustable venting hood is positioned external to both the grill enclosure and the smoking chamber, wherein the first opening of the adjustable venting hood is positioned upon a horizontal plane atop the enclosing member above the grill enclosure, wherein the adjustable venting hood slopes upward toward the smoking chamber, and further wherein a second opening of the adjustable venting hood is positioned upon a vertical plane of the smoking chamber; and
    a cab portion of the locomotive-shaped cooking apparatus enclosing the smoking chamber, the smoking chamber coupled to the second opening of the adjustable venting hood, the smoking chamber to receive the smoke to be released and channeled from the grill enclosure via the adjustable venting hood, wherein the smoke to be released from the grill enclosure and to be channeled from the grill enclosure through the adjustable venting hood to the smoking chamber contains smoke to be produced by the fuel source in the grill enclosure and also smoke to be produced from the grilled food products; and
    wherein the smoking chamber includes one or more racks connected to an axle, the one or more racks capable of rotating around the axle.

6. The locomotive-shaped cooking apparatus of claim 5, further comprising an adjustable vent coupled with the grill enclosure which allows heat to be released from the locomotive-shaped cooking apparatus to control the temperature of the grill enclosure.

7. The locomotive-shaped cooking apparatus of claim 6, wherein the adjustable vent further allows heat to be released from the grill enclosure to control the temperature of the smoking chamber.

8. The locomotive-shaped cooking apparatus of claim 5, wherein the adjustable vent and the adjustable venting hood operate in concert to control the temperature and the smoke in the grill enclosure and the smoking chamber.

* * * * *